United States Patent [19]

Goedecke

[11] Patent Number: 5,301,717

[45] Date of Patent: * Apr. 12, 1994

[54] VALVE BASE PLATE ASSEMBLY

[75] Inventor: Wolf-Dieter Goedecke, Unterkirnach, Fed. Rep. of Germany

[73] Assignee: Mannesmann Aktiengesellschaft, Dusseldorf, Fed. Rep. of Germany

[ * ] Notice: The portion of the term of this patent subsequent to Feb. 9, 2010 has been disclaimed.

[21] Appl. No.: 866,790

[22] Filed: Apr. 9, 1992

[30] Foreign Application Priority Data

Apr. 9, 1991 [DE] Fed. Rep. of Germany ....... 4111893

[51] Int. Cl.⁵ ............................................. F16K 71/00
[52] U.S. Cl. ...................................... 137/884; 137/269
[58] Field of Search ................................ 137/884, 269

[56] References Cited

U.S. PATENT DOCUMENTS 4,078,574 3/1978 Kosarzecki .
5,184,647 2/1993 Goedecke et al. .................. 137/884

FOREIGN PATENT DOCUMENTS 0130548 1/1985 European Pat. Off. ...... F16K 27/02
0391269 10/1990 European Pat. Off. ...... F15B 13/00
2178139 2/1987 United Kingdom ......... F16K 11/10

Primary Examiner—John C. Fox
Attorney, Agent, or Firm—Cohen, Pontani, Lieberman & Pavane

[57] ABSTRACT

A base-plate body (1a) which has a polygonal outer contour (2) with a plurality of electrically actuatable continuous valves (6), which have a diameter which is less than the thickness of the base-plate body (1a). A pressure-fluid connection (P) and pressure-fluid outlet connections (A1, A2) are provided on the base-plate narrow sides (10).

The continuous valves (6), include outlets (15) each, of which is connected to a pressure-fluid outlet connection (A1, A2). The outlets (15) are also in communication with a respective pressure sensor (16); and the electric connecting lines (18, 19) of the electromagnets (7) and the pressure sensors (16) are conducted to the central signal connection (12).

4 Claims, 3 Drawing Sheets

VALVE BASE PLATE ASSEMBLY

BACKGROUND AND SUMMARY OF THE INVENTION

A valve base plate, in particular for gaseous media, is known from Federal Republic of Germany A1-39 17 242, corresponding to EP 0,391,269 A1, which is expressly incorporated herein by reference. This valve base plate consists of a base-plate body which has a polygonal outer contour, a plurality of electrically actuatable individual valves which have a diameter which is less than the thickness of the base-plate body, a pressure-fluid connection arranged on each base plate narrow side and having a pressure-fluid outlet connection associated with each individual valve and arranged on a lower base-plate narrow side. A channel extending parallel to the base-plate end sides is also provided, which connects the inlet channels of all individual valves for the supply of pressure thereto. The base plate also has a central signal connection in which the electric connections for the individual valves are brought together.

The known device, however, concerns only base plates which receive on-off valves. The term "on-off valves" is meant to include, inter alia, directional valves which free or block a predetermined line connection. Such valve batteries are of small structural size, have a high rate of flow, are of relatively minimum weight and produce extremely short switch times. The installation of such valve base plates, which are only about 30 to 40 mm thick, required the development of miniature directional valves which furthermore must operate with exceptionally high rates of flow. Such valve base plates permit a simple and rapid modification of existing pressure-fluid systems and the control of handling devices, gripper systems, cylinders, rotary drives, and the like.

The known embodiment of such valve base plates in the form of on-off valves such as, for instance, directional valves, is sufficient for regulating processes but not for automatic control processes.

The present invention focuses on the problem of further developing the known valve base plate and valve batteries, i.e. to make it also suitable for automatic control functions.

This object is achieved in accordance with the present invention in the manner that the individual valves are constructed as continuous or proportional valves, that their outlets, each of which is connected to a pressure-fluid outlet connection, are connected with a corresponding, preferably integrated, pressure sensor and that the electric connecting lines of the electromagnets and of the pressure sensors are conducted to the central signal connection. The advantages obtained with the device of the present invention consist, in particular, of the increase in the number of possible functions of such a valve base plate so that automatic control functions can now also be performed. The small structural size, the high rate of flow of such special valves, and the relatively low weight with short switch times are retained, as in the known valve base plate for on-off valves. The integrated pressure sensors of the present invention are of particular value here, having been previously present only in separate pressure servovalves with integrated pressure recorders or receivers (sensors). The valve base plate of the present invention, however, also permits the optional association with on-off base plates and vacuum base plates, thereby providing a wide spectrum of use. In this way, not only pressures but also vacuums can be adjusted rapidly and exactly at any desired value. The value base plate of the present invention can, for instance, be used as tensile-stress control for sheet webs, power-controlled drives, tightness-testing systems, blast-air controls, and many other applications.

In accordance with a further feature of the invention, at least two continuous valves or proportionally adjustable valves are arranged in the same plane, and the connecting lines to the pressure parts of the pressure sensors are arranged in each case extending in pairs between two continuous valves. This manner of arrangement advantageously satisfies both the mechanical requirements and the electrical requirements made on such a valve base plate and furthermore satisfies the requirements made as to suitable distribution of space.

In accordance with other features, the present invention provides that in the region of the pressure-fluid outlet connections, there be arranged a blind hole which extends perpendicularly to the end side of the base plate and may optionally be sealed from or connected to a similar blind hole of an adjacent valve base plate. In this way, the valve base plate is imparted the ability to be used in combination with other types of such base plates.

In another embodiment, a plurality of different continuous valves is provided. By this measure, the spectrum of use of such valve base plates is greatly increased.

BRIEF DESCRIPTION OF THE DRAWINGS

The present invention will be described in further detail below with reference to the accompanying drawings in which.

DETAILED DESCRIPTION OF THE PRESENT PREFERRED EMBODIMENTS

Figure 1:
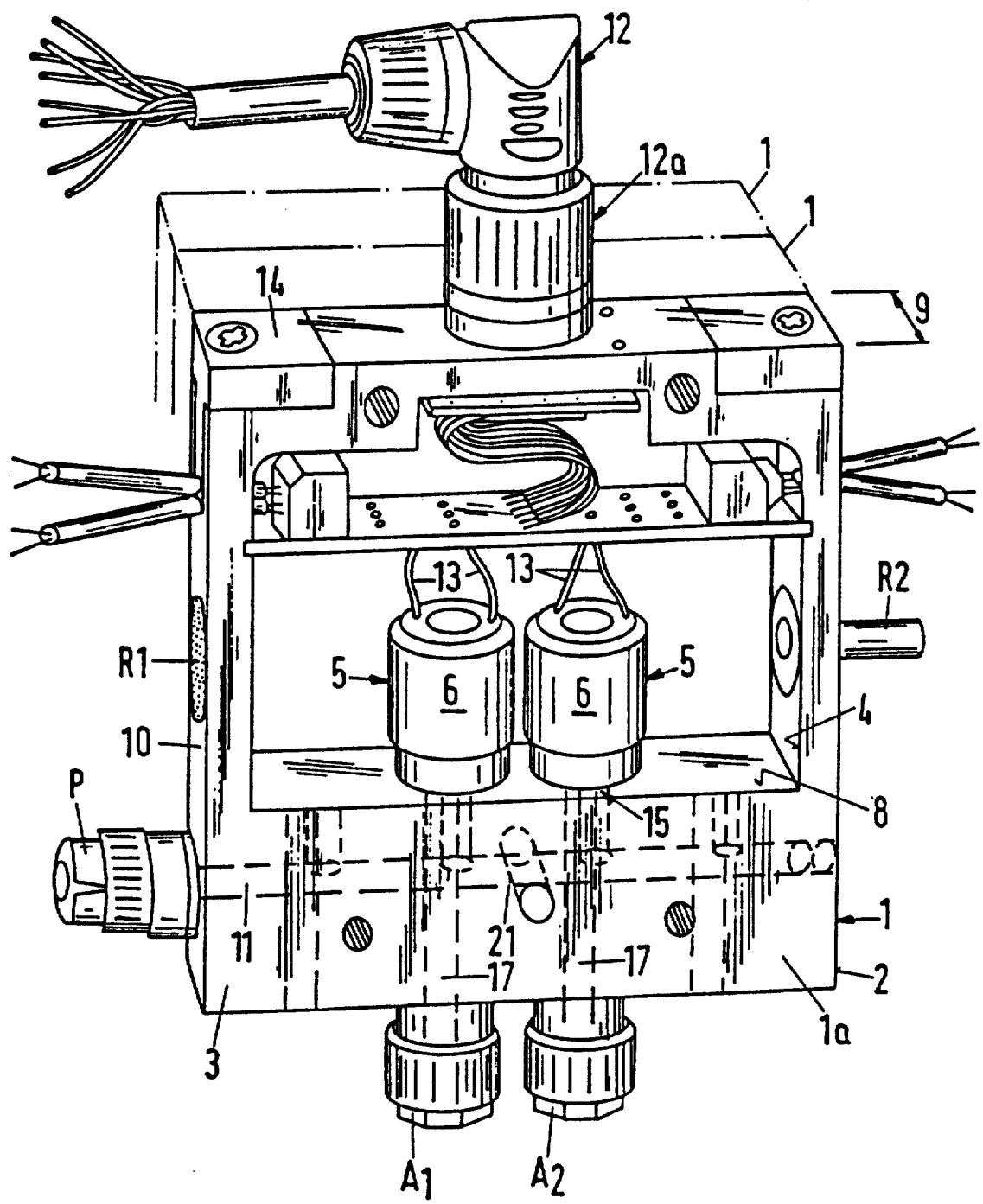
FIG. 1 is a perspective side view of a valve base plate with servovalves as component.
Figure 2:
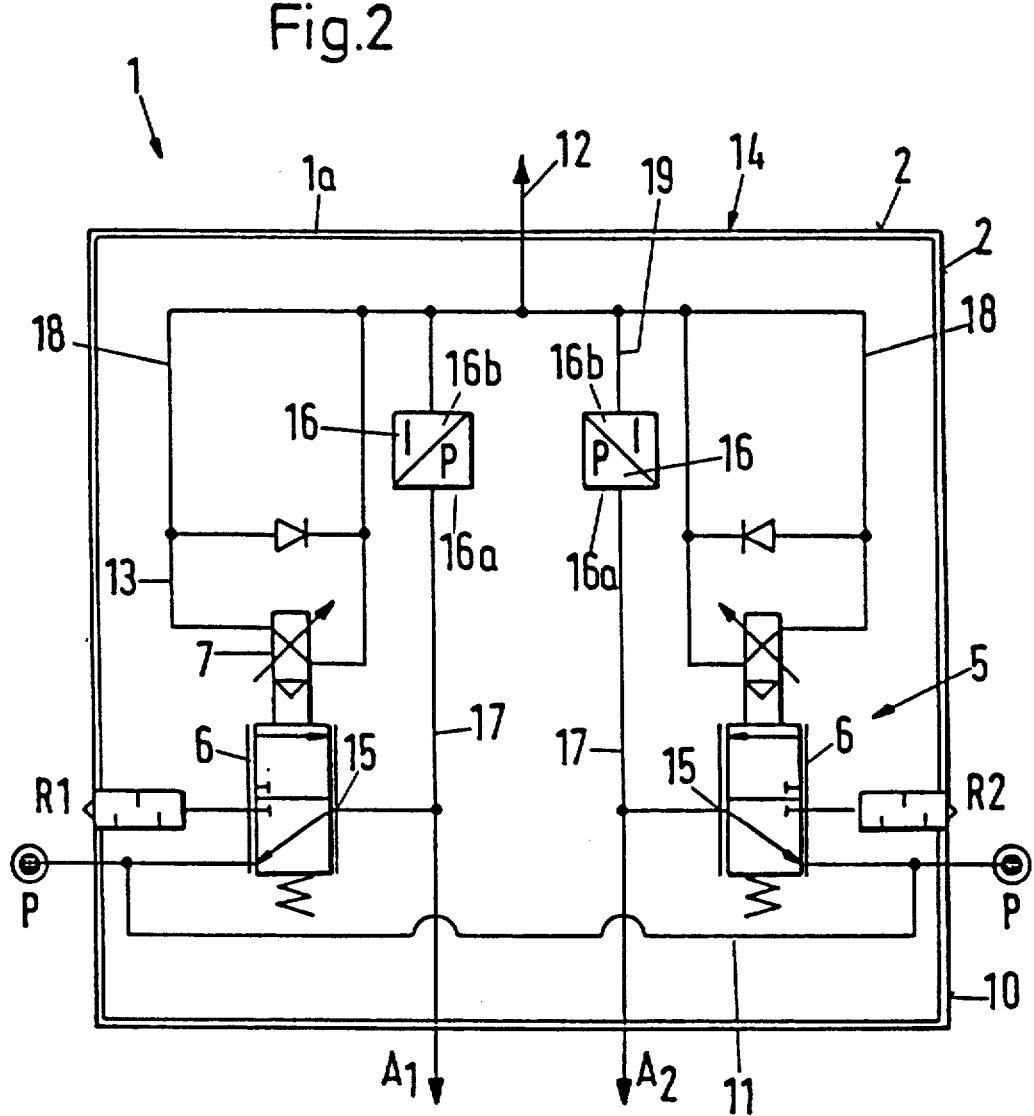
FIG. 2 is a block diagram of the valve base plate.

A valve base plate 1 is constructed with a polygonal outer contour 2, i.e. rectangular contour as shown in the drawing. The base-plate body 1a has base-plate end sides 3. Individual valves 5 consisting of continuous valves 6 are arranged alongside of each other in a cutout 4. The corresponding electromagnet 7 extends beyond a cutout plane 8. The continuous valves 6 have a diameter which is smaller than the thickness of the base-plate body 1a. On one or both base-plate narrow sides 10, pressure-fluid connections P and vent connections R1 and R2 are provided, a channel 11 which extends parallel to the end sides 3 connecting the pressure supply for all individual valves 5 to each other. A central signal connection 12 is furthermore provided for the electric connections 13 of the continuous valves 6 on an upper narrow side 14 of the base-plate body 1a.

The individual valves 5 are continuous or proportional valves 6. Each of the outlets 15 are connected to a corresponding pressure-fluid outlet connection A1, A2, and a pressure sensor or pressure transducer 16 is in communication with the corresponding pressure line 17. The pressure part 16a of the pressure sensor controls the pressure as a function of the electrical part 16b. The output pressure is thus a function of the current flow in the electrical part 16b.

The electric connecting lines 18 of the electromagnets 7 and the connecting lines 19 of the pressure sensors 16 are conducted to the central signal connection 12 and combined there in a connector 12a.

At least two continuous valves 6 are arranged in the same cutout plane 8 in the valve base plate 1. The connecting lines 18 and the connecting lines 19 to the electrical flow parts 16b of the pressure sensors 16 are in each case arranged extending in pairs between two continuous valves 6 and passed to the signal connection 12.

In the region of the pressure-fluid outlet connections A1, A2, there is arranged a blind hole 21 which extends perpendicularly to the base-plate end side 3 (FIG. 1), it being normally sealed from a similar blind hole in an adjacent valve base plate 1, except when a connection is desired. The continuous valves 6 can also be formed of different valves with correspondingly different flow quantity values, pressure values, etc.

It is furthermore possible to produce a connection from the pressure-fluid outlet connections A1, A2 instead of the blind holes 21 by means of a hose connection to corresponding compressed-air connections on a corresponding base plate. In the same way, of course, several such blind holes 21 can be used in order to create corresponding transverse connections between individual valve base plates of a valve battery.

Figure 3:
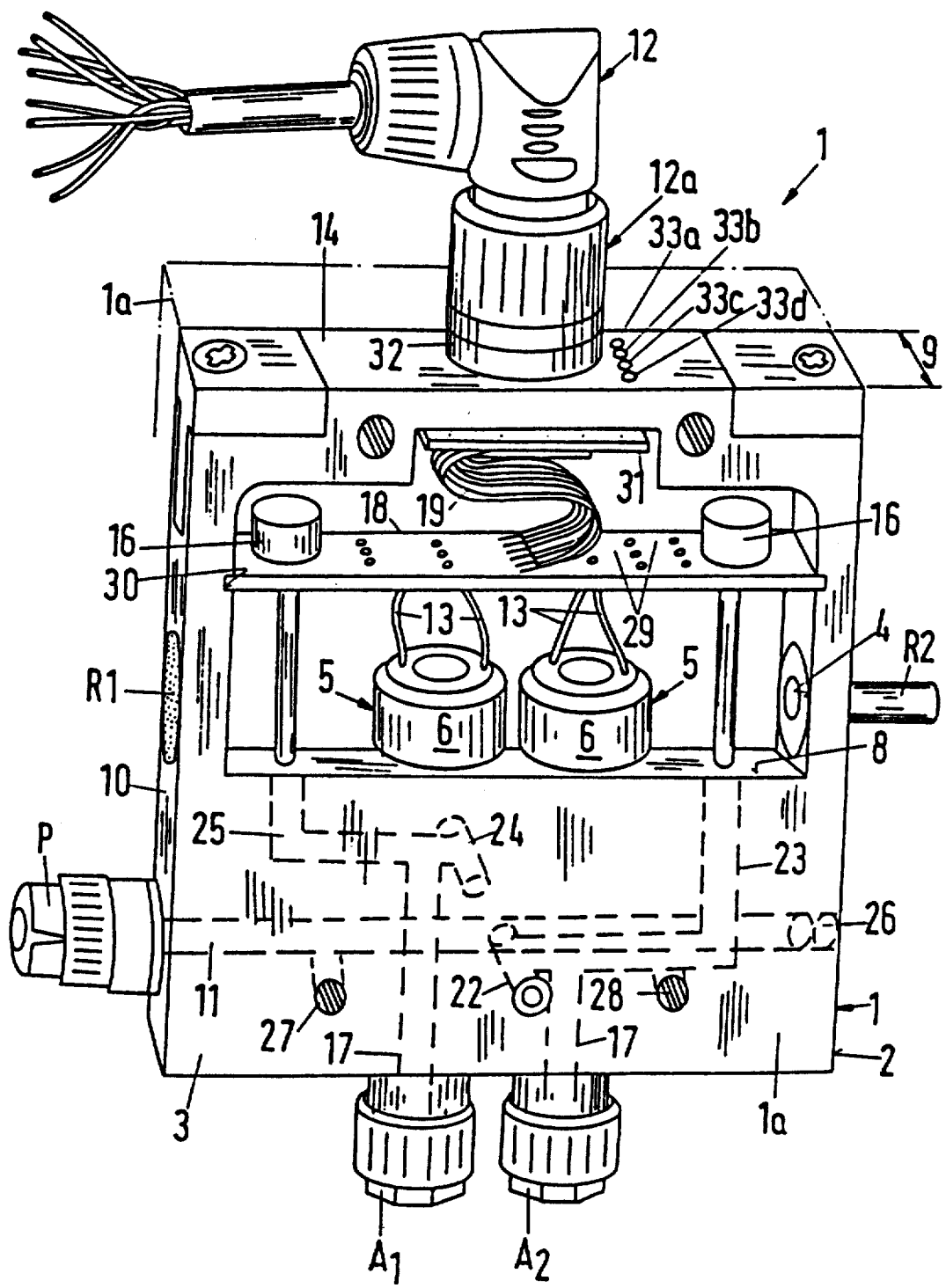
FIG. 3 is a side view similar to FIG. 1 as an alternative solution.

An alternative solution for this is shown in FIG. 3. From the pressure-fluid connection P or the channel 11, there is a transverse hole 22 which passes through a first base-plate body 1a (arranged in the foreground), which is in communication with the pressure sensor 16 via a pressure channel 23 and is connected to the pressure-fluid outlet connection A2. In a second base-plate body 1a (indicated in dashed line in the background), there is arranged a pressure channel 24 which is separated from the pressure channel 23 and is connected with the pressure line 25 to another pressure sensor 16. For this purpose, the pressure-fluid outlet connection A1 is arranged on the rear valve base plate 1. With only one pressure-fluid connection P, the channel 11 is sealed by means of a closure screw 26. Pressure connections could also be applied to pressure channels which are closed by screws 27 and 28.

A circuit board 29 is held in grooves 30 above the continuous valves 6. The connecting lines 18, 19 are conducted via another circuit board 31 into a contact-pin socket 32. Alongside the contact-pin socket 22, there are provided luminous indicators 33a-33d which may be, for example light emitting diodes, provided for visual feedback of the operation of a corresponding valve.

It is particularly advantageous to place the pressure sensors far to the outside. In this way, more room is created for the individual valves 5 in the cutout 4.

The present invention claims priority from German Patent Application No. P 41 11 893.6, filed Apr. 9, 1991, the entirety of which is expressly incorporated herein by reference. An English language translation of said German Patent Application No. P 41 11 893.6 is attached hereto as Appendix and forms part of this disclosure.

It should be understood that the preferred embodiments and examples described are for illustrative purposes only and are not to be construed as limiting the scope of the present invention which is properly delineated only in the appended claims.

What is claimed is:

1. A valve base plate assembly comprising:
   a first base plate body having a thickness and a polygonal outer contour comprising a face plate, an upper narrow surface, a lower narrow surface and opposed narrow side surfaces;
   a plurality of continuous valves within said base plate having a diameter less than the thickness of said base plate body, each of said valves comprising a pressure fluid inlet port, and a pressure fluid outlet port and an electromagnet having an electrical connecting line;
   a pressure fluid inlet connection on at least one of said base plate narrow side surfaces;
   a pressure fluid outlet connection at said lower narrow surface and in fluid communication with each of said pressure fluid outlet ports of said continuous valves;
   a pressure fluid channel extending within said base plate body parallel to said base plate lower narrow surface and connecting each of said inlet ports of said continuous valves for supplying pressure thereto;
   a plurality of pressure sensors each comprising an electrical connecting line and communicating with one of said pressure fluid outlet ports of said valves; and
   a central signal connection on said narrow upper surface for receiving said electrical connecting lines of said electromagnets and said pressure sensors.

2. The valve base plate assembly of claim 1, wherein at least two of said continuous valves are arranged in a single plane, and said connecting lines of said pressure sensors extending in pairs between said two valves.

3. The valve base plate assembly of claim 1, additionally comprising a second valve base plate body for placement adjacent said first valve plate body, said second valve plate. body having a face plate and a blind hole extending perpendicularly to said face plate.

4. The valve base plate assembly of claim 3, additionally having a blind hole in the region of said pressure fluid outlet connections, said blind hole extending perpendicularly to said face plate of said first valve base plate and being sealed off from said blind hole of said second adjacent valve base plate.

* * * * *